United States Patent [19]

O'Leary et al.

[11] Patent Number: 4,659,459

[45] Date of Patent: Apr. 21, 1987

[54] AUTOMATED SYSTEMS FOR INTRODUCING CHEMICALS INTO WATER OR OTHER LIQUID TREATMENT SYSTEMS

[75] Inventors: Richard P. O'Leary, Wayne; Davie B. Lawhon, Bensalem, both of Pa.

[73] Assignee: Betz Laboratories, Inc., Trevose, Pa.

[21] Appl. No.: 756,524

[22] Filed: Jul. 18, 1985

[51] Int. Cl.⁴ .............................. B01J 14/00
[52] U.S. Cl. ................... 210/87; 210/96.1; 210/143; 210/199
[58] Field of Search ............. 210/740, 741, 744, 96.1, 210/101, 143, 199, 205, 87–90

[56] References Cited

U.S. PATENT DOCUMENTS

| | | | |
|---|---|---|---|
| 2,054,798 | 9/1936 | Gibson | 210/741 |
| 2,768,949 | 10/1956 | Hewey | 210/205 |
| 2,780,357 | 2/1957 | Robinson | 210/101 |
| 3,528,545 | 9/1970 | Frazel et al. | 210/96.1 |
| 4,436,148 | 3/1984 | Maxwell | 166/53 |
| 4,460,008 | 7/1984 | O'Leary et al. | 137/93 |
| 4,464,315 | 8/1984 | O'Leary | 261/110 |
| 4,536,845 | 8/1985 | De Vale et al. | 210/96.1 |
| 4,544,489 | 10/1985 | Campbell et al. | 210/96.1 |
| 4,554,078 | 11/1985 | Huggins et al. | 210/199 |

Primary Examiner—Ivars Cintins

Attorney, Agent, or Firm—Caesar, Rivise, Bernstein, Cohen & Pokotilow, Ltd.

[57] ABSTRACT

A computerized chemical application system for a water treatment system. The water treatment system includes a main header into which water flows. Periodically water is dumped from the main header. Make-up water is then introduced. At least one liquid chemical is then provided from a tank under the force of gravity through a valve into the main header to replace those chemicals lost during the dumping process. In particular a system computer calculates the velocity of the introduced chemical based on the amount of time it takes for the chemical to flow past a conductivity sensing probe in a chamber of the system as well as the volumetric capacity of that chamber. With the velocity calculated the computer determines the length of time that the chemical is to be introduced and controls the valve accordingly.

In one embodiment the chamber comprises a vertically oriented tube having diffusion means in the form of a large plurality of spherical bodies at its inlet for diffusing the chemical across the cross-sectional area of the chamber and without creating turbulent flow to produce a relatively sharp interface between the chemical and the water.

21 Claims, 4 Drawing Figures

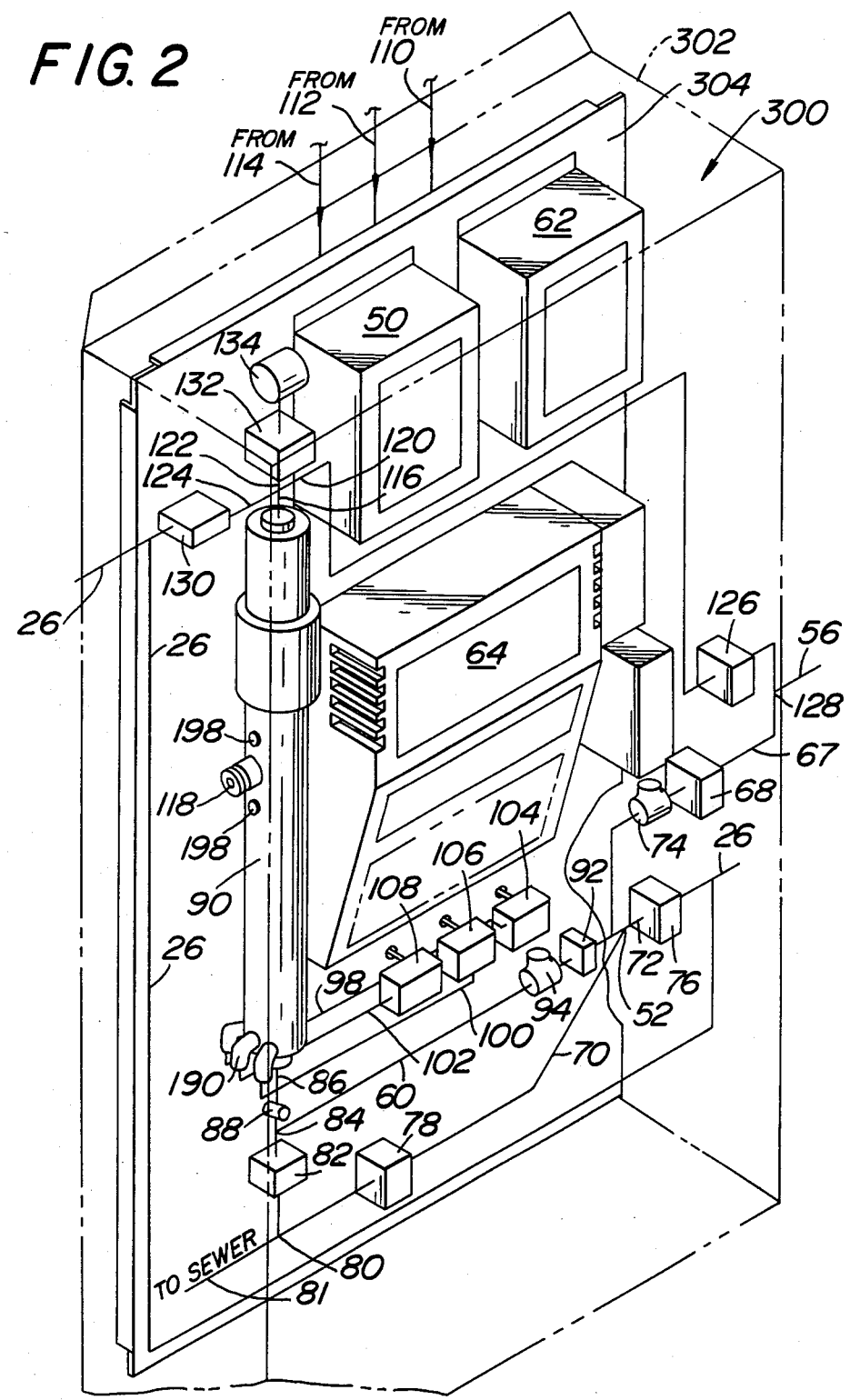

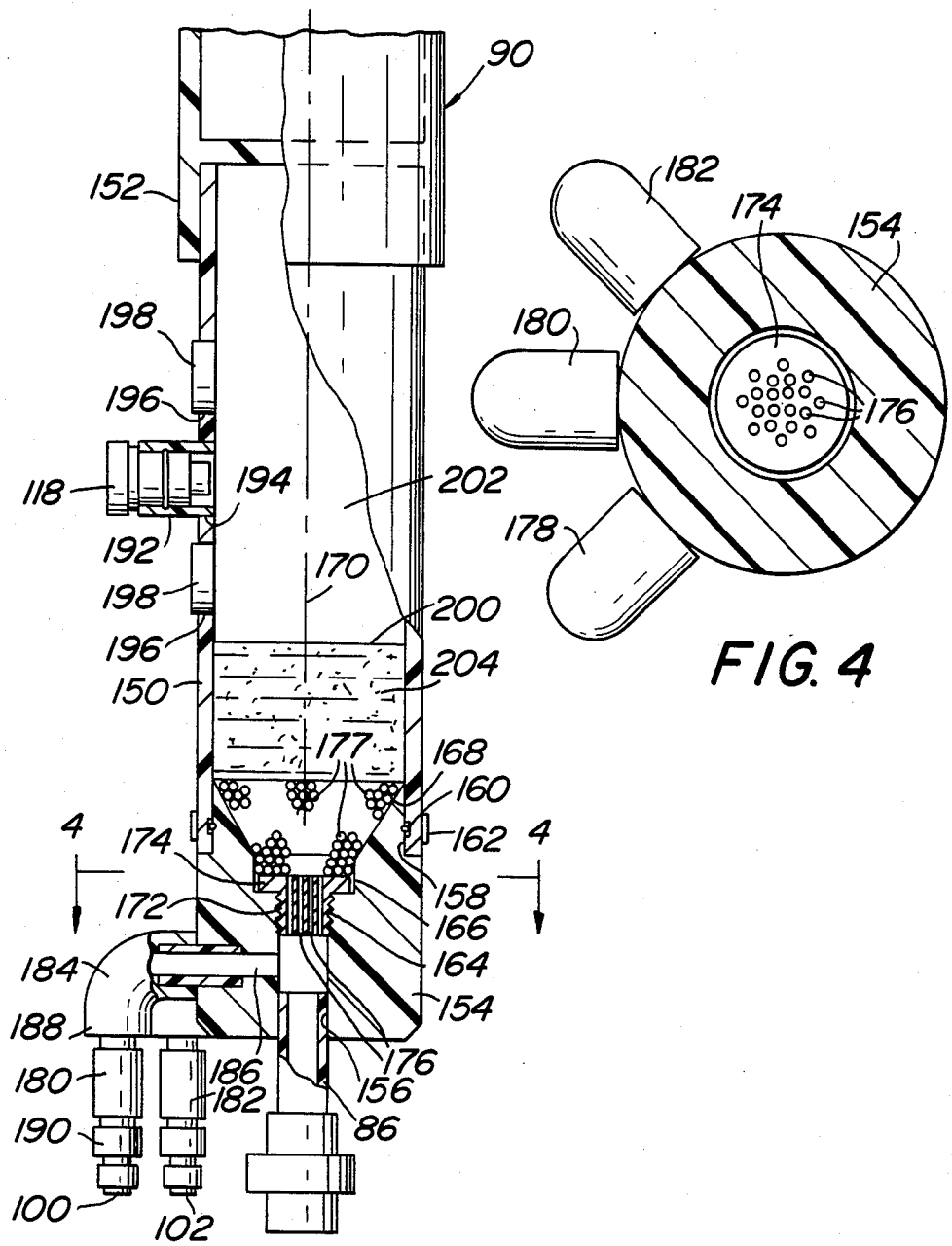

AUTOMATED SYSTEMS FOR INTRODUCING CHEMICALS INTO WATER OR OTHER LIQUID TREATMENT SYSTEMS

BACKGROUND OF THE INVENTION

This invention relates generally to control sytems and more particularly to automated systems for introducing chemicals into water or other liquid treatment systems.

In the copending U.S. patent application Ser. No. 06/607,368, filed on May 7, 1984, and entitled Computerized System For Feeding Chemicals Into Water Treatment System, which has been assigned to the same assignee as the subject invention, and whose disclosure is incorporated by reference herein, there is shown and claimed a system suitable for introducing a desired amount of liquid chemicals into a water treatment, e.g., cooling tower, system under automated, computer control. A summary of that invention is set forth in considerable detail later herein. Suffice for now to state that while the invention of that application is suitable for its intended purposes it may not be suitable for certain small scale water treatment applications. Moreover the system of that invention makes use of electrically operated pumps, such as pulsating pumps, to inject the chemicals into the water treatment system under the control of the computer. In some applications it may be desirable to introduce the chemicals under gravity feed.

Heretofore gravity feed systems have been utilized for providing treatment chemicals into liquid systems, however such prior art gravity feed systems have been generally confined to batch processing, thereby rendering those systems of limited utility. For example in U.S. Pat. No. 4,436,148 (Maxwell) there is disclosed a batch processing system for providing various treatment chemicals to be added to treat petroleum products in or from an oil well or to add treatment chemicals into a water treatment system. In that system valves are controlled to feed treatment liquids to an oil well under only system pressure. In particular the chemical treatment liquid is stored in a drum above a volume chamber. The chamber includes five lines connected to it, each with a valve. A feed line with a feed valve connects the volume chamber to the treatment drum. A vent line with vent valve vents the top of the volume chamber to the atmosphere. A liquid pressure line with a pressure valve connects the flow line to the volume chamber. A flush line with a flush valve connects the bottom of the volume chamber to the well annulus. A gas line with a gas valve connects the volume chamber to the annulus. When the vent valve and the feed valve are open and the other valves are closed, the volume chamber fills with liquid by gravity from the chemicals within the treatment drum. When the pressure valve and the flush valve are open the treatment chemicals which have been measured into the volume chamber are flushed by the produced fluids within the flow line back into to the annulus of the oil well. Thereafter the opening of the flush valve and the gas valve with the concommitant closing of the other valves purges the volume chamber of all liquids, thereby returning it to the condition to be filled again.

While the system of the Maxwell patent is generally suitable for its intended purposes of providing chemicals without the need for pumps, it nevertheless leaves much to be desired from the standpoint of effectiveness. In this regard the system of the Maxwell patent is incapable of precise chemical introduction control since the volume chamber cannot be partially filled (one must introduce the full quantity of chemicals from the tank into the volume chamber). Thus, with the system of the Maxwell patent one cannot adjust the precise introduction of very small quantities of treatment liquids or provide treatment liquids on a continuous basis. Moreover the Maxwell system does not lend itself to automatic measurement of content of the liquid in the tank via measured head pressures.

OBJECT OF THE INVENTION

Accordingly, it is the general object of the instant invention to provide a computerized chemical feed control system which overcomes the disadvantages of the prior art.

It is a further object of the instant invention to provide a automated chemical feed system which enables the precise determination of the introduction rate of liquid chemicals based on the determination of the velocity of the flow thereof;

It is a further object of the instant invention to provide a system for measuring the velocity or chemical feed rate through a line and utilizing that measurement to control the introduction of a measured quantity of said chemicals into said line;

It is still a further object of the instant invention to provide a system for controlling the gravity feed of chemicals into a line under automated control;

It is yet a further object of the instant invention to provide a system for predicting the feed rate of a particular liquid through a line based on the determination of the time interval between the sensing of certain parameters of said liquids.

SUMMARY OF THE INVENTION

These and other object of the instant invention are achieved by providing apparatus for determining a first parameter, e.g., velocity, of at least one fluid flowing through a passageway in a system. The passageway carries at least first and second fluids therethrough and has a predetermined volumetric capacity measured from a point at which the fluids are introduced therein to a downstream point. The second fluid is in the form of a liquid and flows past the downstream point. Detecting means is provided located at the downstream point for sensing the presence of said second fluid by monitoring a second parameter, e.g., conductivity, of said fluids. Means responsive to the detecting means are provided for calculating the first parameter.

In one aspect of the invention the detecting means calculates the first parameter based on the volumetric capacity and on elapsed time from introduction of the second fluid until it reaches the downstream point and the means responsive to the detecting means comprises computing means and valve means responsive thereto. The computing means computes the time that the valve means is to be opened to control the introduction of the second fluid into the passageway.

DESCRIPTION OF THE DRAWINGS

Other objects and many of the attendant advantages of this invention will be readily appreciated as the same becomes better understood by reference to the following detailed description when considered in connection with the accompanying drawings wherein:

FIG. 2 is a perspective view of a portion of the system shown schematically in FIG. 1;

FIG. 3 is a side elevational view, partially in section, of one component, namely a velocity chamber, of the system shown in FIGS. 1 and 2; and FIG. 4 is an enlarged sectional view taken along line 4—4 of FIG. 3.

DETAILED DESCRIPTION OF THE PREFERRED EMBODIMENT

Figure 1:
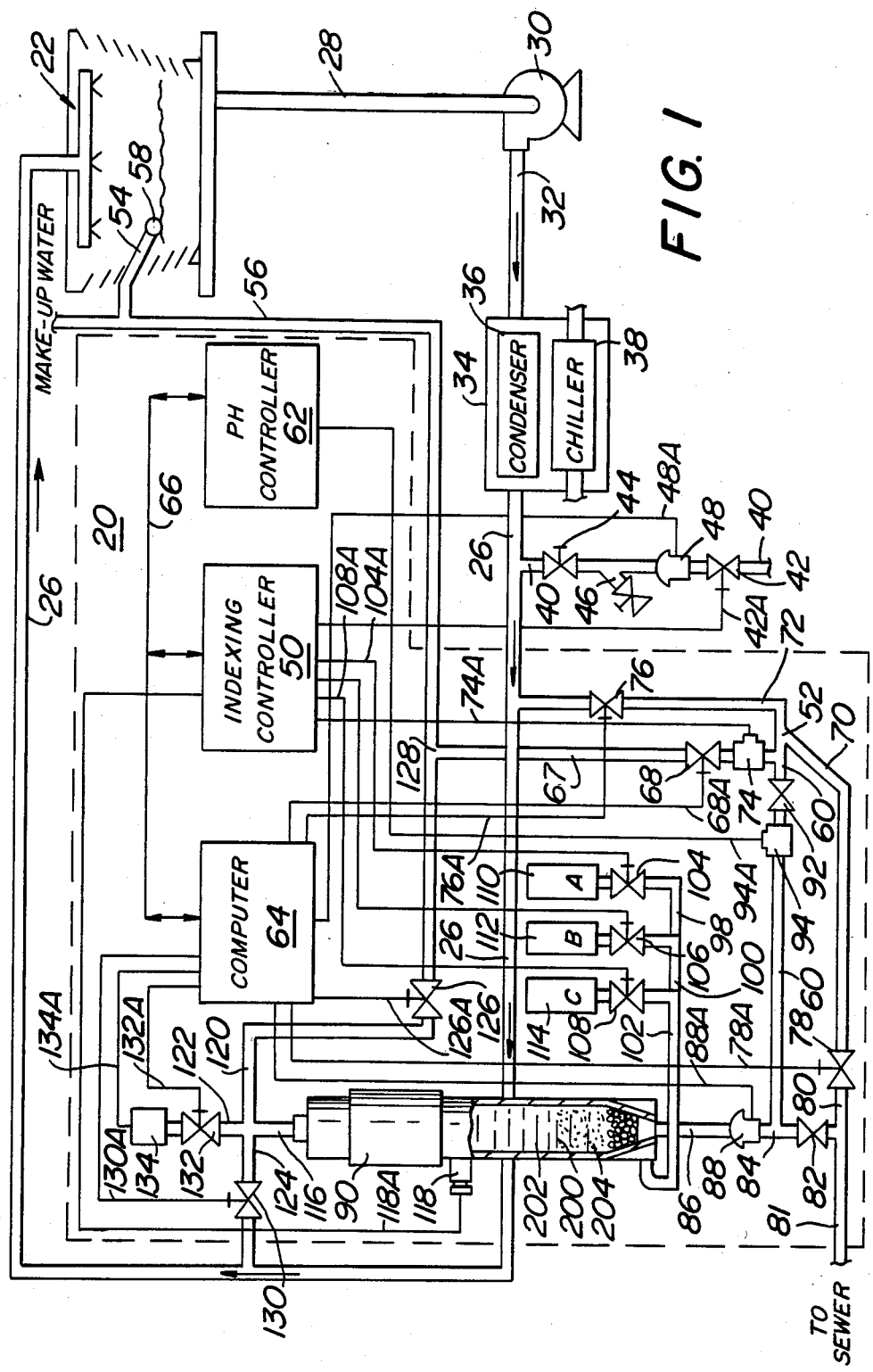
FIG. 1 is a schematic diagram of a water treatment system utilizing the control system of the subject invention.

Referring now to the various figures of the drawing wherein like reference characters refer to like parts, there is shown at 20 in FIG. 1 a computerized chemical feed control system for use in a conventional cooling water tower system 22. While the control system 20 of this invention is shown in a cooling tower system 22 it must be understood that the subject invention can be used in any water treatment or conditioning system. Moreover, as will be appreciated by those skilled in the art, the subject invention can be used for effecting the accurate introduction of one or more chemicals into the water treatment or conditioning system based on accurately measuring the velocity of the chemicals being introduced. This system thus lends itself of particular utility for introducing the chemicals by gravity feed and without necessitating the use of pumps or other powered means for injecting the chemicals therein, although such pumps can be utilized as augmentation or replacement for the gravity feed, if desired.

Before describing the details of control system 20 a general description of the cooling tower system 22 is in order. Thus, as can be seen the cooling tower system is conventional and basically comprises a cooling tower 24 connected in series in a main water carrying header or pipe. The header is a relatively large diameter, e.g., 8″ (20.32 cm), pipe and consists of various serially connected sections used to circulate water from the tower through a conventional heat exchanger and back to the tower. Thus, the outlet of the tower is connected via main header section 28 to a condenser pump 30. The output of the pump 30 is connected, via main header section 32, to the heat exchanger. In particular, the header section 32 is connected as an input to the condenser 36 of the heat exchanger. The heat exchanger also includes a chiller 38 which is connected in a closed loop with associated components (not shown) enabling water to be passed therethrough. The outlet of the condenser is connected to header section 26. This latter section is connected back to the tower inlet.

As will be appreciated by those skilled in the art the heat exchanger 34 includes Freon TM gas therein. The container 36 picks up heat from the chilled water loop of the chiller. The heat picked up is transferred to the water flowing back through the main header. Thus, water is carried back to the cooling tower by header section 26, where it is cooled by atmospheric evaporation. The cooled water is carried by section 28 to the pump 30 for passage back to the condenser.

Since evaporation takes place in the cooling tower an increase of solids develops in the tower water as it is circulated through the system. In order to preclude excess solids from building up, the cooling tower includes means to enable water to be drained from the system periodically. Such means includes a bleed valve line 40 having an automatic bleed valve 42, a manual valve 44, a strainer 46 and a flow meter 48. The draining operation is commonly referred to as "blow-down" and is accomplished when the conductivity of the tower water reaches a predetermined "set point" value. In particular, as in conventional in the prior art, a conductivity or indexing controller 50 is utilized to monitor the conductivity of the tower water. That controller is coupled to the automatic bleed valve 42 via the control line 42a from a computer (to be described later) in control system 20, whereupon the automatic bleed valve is opened when the tower water conductivity reaches a first predetermined set point and it is closed when it reaches a second predetermined (lower) trip point. The flow meter 48 is connected via an electrical conductor 48a to the system computer for monitoring the rate of flow of the water drained during blow-down.

In order to replace the water that is dumped during each blow-down operation and that which leaves the system by evaporation "make-up water" is introduced in the cooling tower. The make-up water is introduced via a make-up conduit 54 which a connected via line 56 to a source or sources of make-up water (not shown). That source can consist of city water, lake water, well water, etc. The make-up water conduit includes a float valve (not shown) in fluid communication therewith and located within the tower. A float 58 is located within the tower and is associated with and controls the operation of the float valve. The float is utilized to determine when a sufficient amount of make-up water has been introduced into the cooling tower to make-up for the water lost during blow-down and evaporation.

As is known the addition of the chemical, such as a water treatment product, has a known amount of conductivity (micromhos) part per million of chemical treatment. Cooling tower systems, offer a difficult challenge insofar as the control of chemical treatment on the basis of sensed conductivity because of various factors, such as evaporation, blow-down, and windage loss. Moreover, variation or fluctuations in make-up water had made conventional conductivity controllers ineffective in maintaining proper chemical concentration and water treatment levels and cooling water systems prior to the invention in an indexing controller set forth in U.S. Pat. Nos. 4,464,315 and 4,460,008, whose disclosures are incorporated by reference herein.

The indexing controller of those patents includes a probe to monitor the electrical conductivity of the water in the cooling tower. When the indexing controller determines that the conductivity of the cooling water in the tower has reached a predetermined maximum value to maintain a desired Langelier's number, the controller causes the automatic blow-down valve to open to effect blow-down of the system. The dropping water level in the tower during blow-down is sensed by the tower float and an associated valve is opened to introduce replacement or make-up water therein. In order to replace the chemicals which are lost during the blow-down operation the replacement chemicals are introduced into the system via chemical introduction line.

The conductivity of the make-up water introduced into the tower is sensed by the indexing controller and a signal indicative thereof is provided to the controller. The controller utilizes that signal to calculate the adjusted trip point for the system. When the conductivity of the tower water drops below the adjusted trip point the controller provides signals for the automatic bleed valve to stop the blow-down operation. In addition the controller causes electrical pumps, which are utilized to introduce replacement chemicals into the system, to stop operation. When sufficient make-up water has been introduced into the tower to compensate for the water dumped, the float is raised to its normal position and its associated float valve closed to prevent further introduction of make-up water (except for that which is necessary to replace water lost during evaporation). The cooling tower system is now ready to recirculate the cooling water therethrough till the conductivity of the water in the cooling tower reaches the adjusted trip point so that a new blow-down cycle occurs.

The use of an indexing controller, such as set forth in the aforenoted patents enables the trip point, that is the maximum concentration for cooling tower water, to be adjusted to reflect changes in conductivity of the make-up water to maintain a desired predetermined Langelier's index number(s). Thus, even if the make-up water varies substantially in conductivity, as could occur if the make-up water is switched from lake water to well water, etc., the desired Langelier's index for the water in the system can be maintained to prevent scaling or corrosion, while maximizing the number of cycles that the cooling water can be recirculated through the system before blow-down.

Notwithstanding the development of the indexing controller of the aforenoted patents, the automatically application of water treatment chemicals based on conductivity had not proved feasible for various reasons, e.g., the concentration of water treatment products in conventional total treatment ranges develop a conductivity which is too low to be used for direct sensing and control.

As mentioned earlier in the aforementioned copending U.S. patent application Ser. No. 06/607,368 there is disclosed and claimed a computerized chemical application system for water treatment applications. That system enables a greater increase in conductivity per treatment level, thereby making conductivity an acceptable means of controlling chemical concentration. Moreover the system of that application utilizes a novel technique and apparatus enabling one to acturately mix plural fluids together based upon sensed parameters, e.g., conductivity. In particular, in the embodiment shown in that application the conductivity of a known liquid stream, such as make-up water, is determined, the liquid chemicals to be introduced into the water to treat the water are injected into the known stream. The conductivity of the mixed water and chemicals is determined after equilibrium occurs to provide an indication of the differential conductivity, that is the conductivity of the liquid before and after the introduction of chemicals. Based on known and empirically derived data correlating conductivity to chemical concentration, the concentration (e.g., poundage) of chemicals introduced into the stream is readily determined. With the flow rate of the water in the stream known the amount of chemicals feed into the stream per minute is readily calculated. This information is then used to control the duration of times that a pulsating feed pump is kept on to introduce the desired amount of chemical into the system, e.g., the amount of chemical lost during blow-down.

To carry out those ends that system utilizes a computer to compute the chemical requirements of the system, the blow-down time, the evaporation time, and the appropriate chemical feed time to maintain the existing system. The computer also monitors the conductivity of the make-up water and the tower water (the water in the main header). Upon the activation of the blow-down valve under control of an indexing controller in the system the conductivity limit for the system is recorded. The computer then monitors the blow-down valve to determine the time that blow-down has occurred. In addition the computer calculates the volume, e.g., gallons of tower water dumped during the blow-down operation and also calculates the weight, e.g., pounds, of chemicals lost during such dumping action. Under the control of the computer and the indexing controller the pulsating chemical feed pump is actuated.

Like the control system of the patent application No. 607,368, the system 20 of the subject invention provides computerized control of chemical introduction. However in this invention the chemical introduction is effected as a function of measured velocity. Thus, the system 20 of this invention is particularly suited for the introduction of chemicals via gravity feed. To that end the system of this invention makes use of the fact that the introduction of water treatment chemicals dramatically increases the conductivity of the water. Thus by monitoring water conductivity and by measuring the length of time it takes for the introduced chemical(s) to pass a certain point the velocity of the chemicals can be calculated. Based on this calculation the time that the chemicals will be allowed to flow by gravity into the system can be readily calculated to provide the desired poundage.

As can be seen in FIG. 1 the computerized chemical feed system 20 basically comprises a velocity feed chamber 90 into which various water treatment chemicals, acids and biocides, etc., are arranged to be introduced, via gravity feed, through electrical control valves under computer control. The system 20 also includes the heretofore mentioned indexing conductivity controller 50 and a Ph controller 62. The indexing controller 50 is connected to plural conductivity sensing probes (to be described later) and to a system computer 64 via a bidirectional electrical bus 66. The Ph controller 62 is connected to a Ph sensing probe (also to be described later) and to the computer 64 via the bus 66.

The computer 64 is of any suitable construction such as a commercially available Apple II computer with appropriate software which can be included in the computer or available on associated storage device, such as a disk drive 65 (FIG. 2). The computer and associate components of system 20 are arranged to be located within a housing, such as an explosion proof housing (to be described later), at a facility or plant where the cooling tower is located. The system computer 64 is used to control the operation of the various components of the system 20. If desired the system computer 64 can be coupled via a communications interface (not shown) including a modem for communicating over conventional telephone lines with a remote or host computer (not shown). The remote computer can be located at a remote site from the facility at which the system is located to serve as a central control for any number of systems 20.

The system 20 includes two water inputs, namely a side stream from the system water flowing through header 26, and the make-up water. To that end a conduit 72 is connected via a T-connection to the header 26 downstream of the heat exchanger 34. The conduit 72 is a relatively small diameter, e.g., ¾" (1.9 cm) conduit having a electrical control valve 76 located therein. Electrical control for the valve 76 is provided via line 76a from computer 64. A conventional strainer 52 is connected to conduit 72. The strainer 52 includes an outlet coupled to a drain line 70. Connected downstream of the strainer 52 is a make-up water feed line or conduit 67. The make-up water feed line is connected via T-coupling 128 to make-up water line 56. An electrically operated valve 68 is located in conduit 67. The electrical control for valve 68 is provided via line 68a from computer 64. Also located within conduit 67 is a conventional conductivity probe 74 which is electrically connected via line 74a to indexing controller 50. The conduit 67 is also connected via a T-coupling to the strainer 52 and to another conduit 60. Conduits 60 and 67 are both of the same diameter as conduit 72. Located within conduit 60 is a conventional flow control valve 92. The flow control valve is arranged to establish a predetermined flow rate, e.g., five gallons per minute, through the conduit 60. This controlled flow prevents excessive flow through the velocity chamber 90, which action could impede proper operation of the system as will be understood later.

A conventional Ph measuring probe 94 is located in conduit 60 downstream of valve 92. The Ph probe 94 is electrically connected via line 94a to the Ph controller 62. The downstream end of conduit is connected to a T-coupling 84. One side of T-coupling 84 is connected to a conduit 86 which serves as the input for the velocity chamber 90. The conduit 86 is also similarly sized to conduits 60, 72 and 67. A conventional flow meter 88 is located within conduit 86 and is electrically connected via line 88a to the computer 64. The other side of T-coupling 84 is connected to a conventional pressure relief valve 82. The other side of the pressure relief valve 82 is connected to a T-coupling 80, one side of which is connected to a conduit 81 running to a sewer, and the other side of which is connected to the downstream side of an electrically controlled valve 78. The upstream side of the valve 78 is connected to the drain conduit 70. Electrical control of valve 78 is effected via control line 78a connected to computer 64.

The velocity chamber 90 is shown in detail in FIGS. 3 and 4 and will described specifically with reference thereto. Suffice for now to state that the velocity chamber 90 is a hollow structure into which the water treatment chemicals are introduced so they may flow past a conductivity sensing probe, to be described later, mounted therein. The velocity chamber is constructed so that each chemical introduced therein forms a relatively sharp interface with the water already in the velocity chamber. The conductivity probe is arranged to monitor the conductivity of the liquid flowing past it. Thus the probe is enabled to sense when the interface has reached it and based on the time that has elapsed from the introduction of the chemical from the chemical feed tank until the chemical interface reaches the position of the probe the computer can calculate the velocity of the chemicals being fed to the velocity chamber. Based on that calculation the computer calculates the time interval that the chemical is to be introduced to replace that which was lost during blowdown.

In the embodiment shown in FIG. 1 the system 20 is arranged to selectively provide three chemicals into the velocity chamber 90 for introduction into the system 22. To that end system 20 basically comprises three chemical feed conduits 98, 100, and 102, each terminating at the lower end of the velocity chamber 90. Each conduit is connected via a respective valve to a tank holding a water treatment chemical. Thus, line 98 is connected via an electronically actuated valve 104 to a tank 110 holding a chemical designated "A" therein. Similarly line 100 is connected via an electronically actuated valve 106 to a chemical tank 112 holding a chemical designated "B" therein. And line 102 is connected via an electronically actuated valve 108 to a tank 114 holding a chemical designated "C" therein. The valves 104, 106 and 108 are connected via respective electric control lines 104, 106 and 108, to the conductivity controller 50 and from there through bus 66 to the computer.

As mentioned earlier the velocity chamber 90 is of generally hollow construction. To that end it includes an outlet located at its top end and in communication with an outlet conduit 116. As also mentioned earlier a conductivity probe is mounted within the velocity chamber. That probe is denoted by the reference numeral 118 and as can be seen is mounted adjacent the middle of the chamber. The probe 118 is of conventional construction and is electrically connected via line 118a to the conductivity controller 50.

The outlet conduit 116 of the velocity chamber 90 is connected to three conduits 120, 122 and 124 via a four-way coupling. The conduit 124 serves as a return line to the main header 26. An electrically operated valve 130 is located in line 124. Electrical signals to valve 130 are provided via line 130a connected to computer 64. The conduit 120 is connected via an electrically actuated valve 126 to a T-coupling 128 joining the make-up water lines 56 and 72. The valve 126 is connected via an electrical conductor 126a to the computer 64. An electrically actuated valve 132 is connected in line 122 and a conventional pressuring measuring cell 134 is located in line 122 upstream of the valve 132. The valve 132 is connected via an electrical line 132a to the computer 64, while the cell 134 is connected via an electrical line 134a to the computer.

Operation of the system 20 is as follows: In normal operation the tower water flows from the tower 24 through header 28, circulating pump 30, heat exchanger 34, and header 26 back to the tower. At the same time a side stream of water flows into the conduit 72 and through valve 76 (which is opened under the control of the computer and effected via line 76a). The water flowing through conduit 72 enters the strainer 52 where it is strained and thereafter the strained water passes into conduit 60, past the flow control valve 92. This valve regulates the flow to a sufficiently low level to ensure proper operation of the velocity chamber as will be described later. The water flows through conduit 60 past Ph probe 94 and to a T-connection 84. From the T-connection the water flows into velocity chamber inlet passage 86 and past the flow meter 88.

The water enters the velocity chamber 90 at the bottom and flows up through the velocity chamber to the outlet at the top end. The exiting water then flows through outlet conduit 116 and into communicating conduit 124. The valve 130 in conduit 124 is held open under the control signal provided from computer 64 via control line 130a while valves 132 and 126 are held closed by the signals appearing on lines 132a and 126a from the computer 64. Thus, the water passing through conduit 124 is enabled to rejoin the water in the main header 26.

In normal operation the computer 64 receives signals on line 88a from the flow meter 88 indicative of the rate of flow into the velocity chamber. In the event that a low flow is sensed, i.e., a flow rate lower than the setting of the flow control valve 92, and which could be indicative of the presence of debris plugging the strainer 52 or the velocity chamber 90, the computer provides a signal via line 130a to shut-off valve 130 while providing a signal on line 78a to open valve 78. This action causes the system water 26 flowing through conduit 72 to flush the strainer 52 with what is called a "surface flush" whereupon the debris flows out through line 70, open valve 78 and conduit 81 to the sewer. The computer then monitors the signal appearing on line 88a which is indicative of the flow rate to see if the problem of low flow has been remedied. If it has, the computer provides a signal via line 78a to valve 78 to effect the closing of valve 78 while also applying a signal via line 130a to valve 130 to open valve 130. If, however, the flow rate is still low the signal on line 130a to valve 130 keeps the valve closed while the signals on lines 68a and 78a keep valves 68 and 78, respectively, open. This action causes make-up water flowing through conduit 67 to enter the downstream side of the strainer 52 to flow upstream through it into conduit 70, open valve 78 and associated conduit 81 to the sewer. Thus, any debris on the strainer is back flushed out to the sewer, thereby cleaning the strainer. It should be noted that during the back flushing operation valve 76 is shut via the signal provided on line 76a from the computer.

If after back flushing the flow is still determined to be low the computer 64 provides signals via line 68a, 76a, 78a and 130a to valves 68, 76, 78 and 130 respectively, to close those valves. At the same time the computer provides a signal via line 126a to valve 126 to open that valve, whereupon make-up water flows via conduit 56, valve 126, conduit 120, and conduit 116 into the top of the velocity chamber 90. The water flows down through the velocity chamber 90 out through conduit 86, past flow meter 88 to the pressure relief valve 82. This action causes the pressure release valve 82 to open, whereupon the water and any debris which may have been clogging a screen (to be described later) in the velocity chamber to flow through the valve, the associated T-connector 80 into branch line 81 to the sewer, thereby cleaning the chamber.

After the computer has determined that there is a sufficient flow rate through the velocity chamber it provides signals via line 68a and 78a to valve 68 and 78, respectively to shut those valves. At the same time signals are provided from the computer via lines 130a and 76a to open valves 130 and 76, respectively. This action enables system water to flow through valve 76, conduit 72, conduit 60, conduit 86, past flow meter 88, through velocity chamber 90, through conduits 116 and 124 and valve 130 back to the main header 26. The signal provided from the flow meter via line 88 are monitored by the computer 64.

During system water circulation evaporation of the water occurs, thereby causing an increase of solids to develop in the system. When the conductivity probe 118 in the velocity chamber 90 senses high solid content in the water, i.e., the need for the system to blow-down, the signal coming from it and indicative thereof is provided to the indexing controller via line 118a and from the indexing controller 50 via bus 66 to the computer 64. The computer senses this signal and in response thereto initiates the blow-down operation. In particular the computer provides a blow-down initiate signal via bus 66 to the indexing controller 50 and from the indexing controller 50 via line 42a to the blow-down valve 42. This action causes the blow-down valve to open, thus starting the blow-down operation. The blow-down operation continues in accordance with the teachings of the two aforementioned patents relating to the indexing controller until the lower trip point is obtained, which trip point is also sensed by the conductivity controller 118 in the velocity chamber. In particular when the conductivity of the system water reaches a predetermined set point the computer produces a signal which is provided via bus 66 to the indexing controller and from therethrough line 42a to open the blow-down valve 42, thereby discharging or dumping tower water from the main header 36. The computer also establishes the time interval that the valve 42 remains open. Blow-down continues until the desired set point conductivity for blow-down termination exists. Based on the time sensed during which blow-down occurred, the flow rate through the automatic bleed valve, as sensed by flow meter 48, and provided on line 48a, and on data stored within the computer correlating conductivity to the particular chemicals lost during blow-down the precise amount of chemicals lost during blow-down the computer calculates the amount of water and its proportional ratio of chemicals that were lost during the blow-down operation. Thus the computer now knows how much chemicals to introduce into the system and this data is stored in the computer or on the associated disk drive.

After blow-down is completed chemical feeding to replace the chemicals lost during blow-down is initiated. That operation is as follows: The computer provides a signal via line 76a to valve 76 to close that valve thereby precluding any other system water from entering into the velocity chamber 90. At the same time the computer provides a signal via line 68a to valve 68 to open that valve, whereupon make-up water is enabled to flow through conduits 56 and 67 past valve 68a, past conductivity sensing probe 74 into line 60. The make-up water passes through the flow regulating valve 92, past the Ph sensing probe 94, into the T-connection 86 and from there into conduit 86. The water flows through conduit 86 past the flow valve 88 and into the bottom of the velocity chamber 90. The water flows up the chamber, exits it via conduit 116 and passes through conduit 124 and through open valve 130 back to the system header 26.

The water flowing past both conductivity probes 74 and 118 causes those probes to provide signals, via their respective lines 74a and 118a, to the conductivity controller. These signals are provided back to the computer via bus 66 and compared against one another. If the two readings are the same, thereby indicating that all is operating properly and that the probes are not fouled, the computer provides a signal via line 68a to valve 68 to shut it, thereby ceasing the flow of make-up water into the velocity chamber 90. The computer then provides a signal via bus 66 to indexing controller 50. This causes the controller to provide a signal via line 104a to chemical feed valve 104 thereby opening the valve and allowing the chemical A which is in tank 110 to flow under the force of gravity via line 98 into the bottom of the velocity chamber 90.

The details of the velocity chamber will be described later. Suffice for now to state that it includes means, e.g., a large plurality of small balls, which act to diffuse the injected chemical so as to spread the chemical across the full transverse cross-sectional area of the velocity chamber 90 without the production of eddy currents or substantial turbulence. The introduced chemical thus forms a relatively sharp interface 200 between the preceeding water 202 and it (the chemical being denoted by the reference numeral 204).

Under the head pressure produced by the chemical in the tank 110 the interface and chemical behind it flows up the velocity chamber. At the same time that the computer opens valve 104 it initiates a time measuring sequence. Prior to the interface reaching the probe 118, the probe will be providing a signal via line 118a, which is indicative of the low conductivity of the water 202. When the interface 200 reaches the position of the conductivity probe 118 the much higher conductivity of the chemical 204, causes the probe to provide a signal indicative thereof to the computer. The computer then determines the time which had elapsed from the opening of valve 104 until the interface reached the conductivity probe 118. Stored within the computer or in an associated storage device (e.g., disk drive) is data regarding the volumetric capacity of the conduits and velocity chamber between the outlet of valve 104 and the position of the conductivity probe 118. With this information the computer readily calculates the flow rate, e.g., gallons per minute, that the chemical is actually being introduced into the system under the force of gravity from tank 110 at that moment. As mentioned earlier the computer has stored within it or on an associated storage device, e.g., disk drive, the precise amount of chemical(s) lost during blow-down (the data having been calculated by measured water conductivity). With that data and with the chemical introduction flow rate data just calculated, the computer determines the period of time to keep valve 104 open to introduce the precise amount of chemical to replace that which was lost at blow-down. Thus the computer provides a signal via the indexing controller 50 and line 104a to hold valve 104 open for the desired period of time.

When the time period for chemical feed from tank 110 has expired the computer 64 shuts valve 104 via a signal provided on lines 104a and provides a signal on line 68a to open valve 68. Accordingly, make-up water from conduits 56 and 67 is enabled to flow through valve 68 into conduit 60 and associated inlet conduit 86 into the bottom of the velocity feed chamber 90. This action pushes the chemical 204 out of the velocity chamber 90, through open valve 130 and back to the main header 26 where it is carried to the tower. At the same time the computer monitors the conductivity probe 118 via line 118a to make sure that all of chemical 204 has passed. This fact is determined when the computer senses that the conductivity measured by the probe 118 is equal to the conductivity measured by the probe 74 in the make-up water line 67.

An additional feature of the system 20 is that it is arranged to read the quantity of chemicals left in any of the tanks 110, 112 and 114 in order to effectuate replenishment thereof, when necessary. To that end, under control of computer 64 all the electronically controlled valves of the system are closed by appropriate signals from the computer 64 while the valve 132 and the outlet valve associated with the chemical tank to be read are opened. Accordingly the head pressure of the chemical in that tank is sensed by the pressure cell (transducer) 134. The valve 132 is only kept open momentarily by the computer 64 in order to protect the pressure transducer 134 inasmuch as it is a sensitive device.

It should be apparent that the subject invention requires that the concentration of the chemicals in tanks 110, 112 and 114 be known and stored within the computer inasmuch as the control of the time that the associated chemical introduction valve is open is a function of that concentration. Thus, it is contemplated that the system 20 can also make use of means for determining the concentration of the chemicals in the chemical feed tanks and which information can be provided to the computer for control of the associated chemical introduction valve if the concentration of a chemical within the tank is unknown.

During normal operation of the system 20 shown herein the computer 64 provides the control signals to the indexing controller 50, the Ph controller 64 as well as the various electrically operated solenoid valves to automatically control blow-down operation and the introduction of chemicals into the system. In the event of a failure of power or failure in the system computer 64 the indexing controller 50 switches into a back-up mode of operation. In the back-up mode the controller 50 operates as described in the aforementioned patents relating to the indexing controller. Moreover the indexing controller 50 also includes timing means which serves during back-up operation to reproportion the valves 104, 106 and 108 to the exact rate of chemical feed in proportion to the amount of chemical lost during blow-down. Failure of the system computer or a power failure also causes the Ph controller 62 to operate in a back-up mode. It is in this mode that the Ph controller controls the application of acid via a pump (not shown) or control valve (not shown) in a conventional manner.

In accordance with another feature of this invention the system 20 can determine if either of the two conductivity probes 74 or 118 are fouled. In this regard in order to determine if both the probes are clean (not fouled) the valve 68 is closed and the valves 76 and 130 are opened, all under the control of the computer, so that the same make-up water passes by both probes. The computer, via the indexing controller 50, monitors the conductivity sensed by the two probes. The conductivity which is sensed by each probe is compared against the other to determine if either of the probes is fouled. In this regard if the probes are operating properly and not fouled they should read the same conductivity once the flow of make-up water has preceded past both the probes. The system computer also has stored therein the conductivity of the make-up water. This conductivity is compared against the conductivity sensed by the probes in order to determine if there are different conductivity readings produced by the probes, which probe is in error.

Referring now to FIGS. 3 and 4 the details of the velocity chamber will be described. As can be seen the velocity chamber 90 basically comprises a cylindrical tube 150 having a coupling 152 mounted on the upper end thereof. The coupling 152 includes reducing bushings (not shown) to reduce the outlet of the velocity feed chamber 90 down to the outlet diameter of inlet conduit 116, e.g., ¾" (1.9 mm). Mounted at the bottom of the tube 150 is a cap 154 having a longitudinally oriented centrally disposed bore 156. Disposed within the bore is the upper end of the inlet conduit 86. The cap 154 is mounted on the bottom end of the tube 150 by disposing the inner periphery of the tube adjacent the lower end thereof on a ledge 158 of the cap 154. A O-ring 160 is interposed between the inner surface of the tube 150 and the ledge 158 to act as a seal. A removable band 162 surrounds the lower end of the tube 150 adjacent the O-ring 160 to secure the cap 154 to the lower end of the tube. As can be seen the upper end of the bore 156 is threaded at 164 and then opens to an enlarged cylindrical bore portion 166 terminating in a flared bore portion 168. The angle of the flare is approximately 60° to the longitudinal axis 170 of the tube 150. A threaded cap 172 is disposed within the bore 166 and includes a top portion 174 serving as a floor to the tapered bore portion 168. A plurality of small diameter, e.g., 1/16" (1.6 mm), holes 176 extend through the cap 172 parallel to the longitudinal axis 170. The holes 176 form a screen-like construction. Disposed within the lower portion of the velocity tube 150 within the area defined by the tapered bore 168 and the top surface of the cap portion 174 is a large plurality of stainless steel balls 177 of small diameter, e.g., ⅛" (3.2 mm).

As mentioned earlier the velocity chamber 90 is arranged to receive either of the three chemicals A, B or C from tanks 110, 112 and 114, respectively via lines 98, 100, and 102 respectively. Thus, there is a associated with each of the lines 102, 100 and 98 a respective chemical injector assembly. These three chemical injector assemblies are denoted as 178, 180 and 182 (See FIG. 4). Each injector assembly includes an angled coupling 184 connected to an associated injection passage 186 extending radially into the cap 154 for communication with the central passageway 156 and an associated coupling 190 for connection to the associated chemical introduction conduit. In the preferred embodiment of the invention the chemical introduction conduits are the same size as the water injection conduit 86. As can be seen from the top view of FIG. 4 the three chemical injectors 178, 180 and 182 extend at approximately 45° angles to each other so that they make up approximately 90° of the periphery of the velocity chamber 150.

As will be appreciated by those skilled in the art with chemicals being fed through either of the lines 102, 104 or 106 the chemical flows through radial extending passage 186 into the bore 156 through the openings 176 and up through the interstices between the stainless steel balls 177. This action causes the chemical to spread out or difuse so that when the chemical enters the interior of the tube 150, where the water is located, which water had been previously introduced through conduit 86, the chemical spreads out across the full width of a cross sectional area of the tube 150 and does not create turbulent flow. This action thus results in a rather sharply defined interface 200 between the leading portion of the chemical 204 and the trailing portion of the water 202.

It must be pointed out at the juncture that while the introduction of chemical as shown and described heretofore has been made at the lower end of the velocity chamber. That arrangement is only for those chemicals which are heavier than water. Thus for systems utilizing liquid chemicals which are lighter than water the water inlet tube 86 and the chemical inlet tubes 98, 100 and 104 will be located at the upper end of the velocity chamber with the outlet at 116 of the velocity chamber being located at the lower end thereof. In short the velocity chamber 90 is merely inverted.

As can be seen in FIG. 3 the conductivity probe 118 is mounted within a tubular sleeve 192 extending through a side wall 194 in the tube 150 so that any liquid in the interior tube 150 will be contacted by the working end, that is the internal end, of the probe 118.

In accordance with the preferred embodiment of the invention the probe 118 can be placed at any of three vertical heights on the tube 150. To that end the tube 150 includes two additional openings 196, one above and one below the opening 194. A respective plug 198 is mounted in each of these openings 196. Thus, for some applications it may desirable to move the tube 192 into either the upper or the lower opening 196 to mount the conductivity probe 118 therein.

In accordance with the preferred embodiment of the invention the coupling fittings as well as the tube 150, cap 154 and coupling 152 are all formed of the light weight, strong and non-corrosive material, such as a polyvinyl chloride. The balls 177 are preferably formed of a material which is resistant to chemicals, yet which is tough and strong, such as stainless steel.

Referring now to FIG. 2 the physical location of the components of system 20 described heretofore will now be considered. As mentioned heretofore system 20 is arranged to be located within a housing at the site of the water treatment facility. Moreover, by virtue of the fact that all of the operative components for the system 20 can be located within a single housing, the system is particular suitable for use in applications where flammable fumes may be in the ambient atmosphere and which fuxes must be prevented from being ignited. To that end the system 20 of the instant invention is arranged to be located within an explosion proof housing so that they will not result in the ignition of any fumes in the ambient atmosphere. In FIG. 2 the physical layout of the components of the system 20 are shown in somewhat schematic form within such a housing. To that end as can be seen the components 20 are mounted within the double-walled housing 300. The double-walled housing 300 includes a mounting panel 304 and inner housing wall 302 (shown in phantom lines) and an outer housing wall (not shown) completely enclosing the inner housing wall but spaced therefrom. The space between the inner and outer housing walls is arranged to be pressurized from a source of high pressure air (not shown). All conduits and lines extend into and out of the housing 300 via sealed openings. Accordingly any fumes in the ambient atmosphere surrounding the outer housing cannot gain ingress into the inner housing due to the high pressure barrier between the two walls. This eliminates the hazard of an explosion which could result from electrical ignition of the flammable fumes by the operation of the components of the system 20.

As should be appreciated from the foregoing the system 20 is relatively simple in construction yet enables one to automatically precisely control the introduction of water treatment chemicals into a system on a continuous basis without manual intervention. Moreover, by virtue of the fact that the system is unable to determine actual flow rates of chemicals being introduced it is particularly suitable for use in continuous process gravity feed systems. Finally by virtue of its relatively compact size and construction it is also suitable for control applications in where an explosion hazard could exist from operation of electrical devices.

Without further elaboration, the foregoing will so fully illustrate our invention that others may, by applying current or future knowledge, readily adopt the same for use under various conditions of service.

We claim:

1. In a systen containing a first fluid and into which a second fluid is to be introduced to treat said first fluid, each of said fluids having a respective first parameter, with the value of the first parameter of said second fluid being different from the value of the first parameter of said first fluid, comprising apparatus for introducing said second fluid into said system and for determining the flow rate at which said second fluid is introduced into said system for introduction into said first fluid, said apparatus comprising a passageway coupled to said system for carrying a portion of said first fluid therethrough and fluid introduction means connected therewith for introducing said second fluid into said passageway at a first location, said fluid introduction means effecting the production of an interface between said first and second fluids in said passageway, with said fluids immediately adjacent said interface not being mixed appreciably, said passageway being connected to said system and having a known volumetric capacity measured from said first location to a second location located in said passageway downstream of said first location, said passageway being constructed so that said first and second fluids and said interface therebetween flow past said second location, detecting means located at said second location for monitoring said first parameter of the fluids flowing thereby to sense the presence of said second fluid by detecting the first parameter of said second fluid adjacent said interface, and means responsive to said detecting means for determining the velocity of said second fluid flowing through said passageway and for calculating the flow rate of said second fluid based on said velocity and said known volumetric capacity of said passageway.

2. The apparatus of claim 1 wherein said first parameter comprises the electirical conductivity of said fluids.

3. The apparatus of claim 2 wherein said means responsive to said detecting means operates in response to a change in said conductivity.

4. The apparatus of claim 1 wherein said means responsive to said detecting means comprises computing means and wherein said fluid introduction means comprises value means responsive to said computing means, said computing means computing the time that said valve means is to be open based on said flow rate, whereupon said valve means controls the introduction of said second fluid into said passageway.

5. The apparatus of claim 4 wherein all of said components are located within a housing isolated from the ambient atmosphere to preclude the ignition of any flammable gases in said ambient atmosphere.

6. The apparatus of claim 5 wherein said system is a water system into which at least one liquid chemical is introduced, and wherein said liquid chemical comprises said second fluid and said water comprises said first fluid.

7. The apparatus of claim 1 wherein said system is a water system into which at least one chemical is introduced, and wherein said chemical comprises said second fluid and said water comprises said first fluid.

8. The apparatus of claim 7 wherein said means responsive to said detecting means comprises computing means and wherein said fluid introduction means comprises valve means responsive to said computing means, said computing means computing the time that said valve means is to be open based on said flow rate, whereupon said valve means controls the introduction of said second fluid into said passageway.

9. The apparatus of claim 8 wherein said valve means comprises at least one electronically controlled valve.

10. The apparatus of claim 8 wherein said first parameter comprises the electrical conductivity of said fluids.

11. The apparatus of claim 1 wherein said fluid introduction means comprises a tank for supplying said second fluid into said passageway by gravity.

12. The apparatus of claim 11 wherein said system is a water system into which at least one liquid chemical is introduced, and wherein said liquid chemical comprises said second fluid and said water comprises said first fluid.

13. The apparatus of claim 12 wherein said means responsive to said detecting means comprises computing means and wherein said fluid introduction means comprises valve means responsive to said computing means, said computing means computing the time that said valve means is to be open, whereupon said valve means controls the introduction of said second fluid into said passageway.

14. The apparatus of claim 11 additionally comprising pressure sensing means coupled to said passageway to measure the head of liquid within said tank.

15. The apparatus of claim 1 wherein said passageway comprises an elongated tubular member oriented in a vertical direction having said detecting means mounted, therein.

16. The apparatus of claim 15 wherein said tubular member includes at least one inlet adjacent an end thereof and into which said fluids are arranged to be introduced, said tubular member also comprising means for ensuring that said second fluid does not create turbulent flow, whereupon a relatively sharp, non-turbulent interface is created between said fluids.

17. Apparatus for introducing a second fluid into a first fluid in a system and for providing a signal indicative of the flow rate of said second fluid into said system, each of said fluids having a first parameter, said first parameter of said first fluid having a first value, said first parameter of said second fluid having a second value different than said first value, said apparatus comprising hollow passageway means having a longitudinal axis and a predetermined transverse cross-sectional area, first means for introducing a portion of said first fluid into said passageway means to flow therethrough in a first direction along said axis, second means for introducing said second fluid into said passageway means at a first location, whereupon said second fluid is enabled to flow therethrough in said first direction, diffusing means located adjacent said first location for diffusing said second fluid across said transverse cross-sectional area of said passageway means and without creating any turbulent flow of said second fluid, whereupon a substantially sharp interface between said first and second fluids is created, said passageway means being constructed so the said fluids with said interface therebetween flow therethrough along said axis in said first direction, and detecting means located within said passageway means at a second location located downstream of said first location for determining the presence of said second fluid adjacent said interface flowing thereby by monitoring said first parameter thereof, said passageway means having a known volumetric capacity between said first and second locations, said detecting means providing a signal indicative of the presence of said second fluid, means responsive to said detecting means for determining the length of time which has elapsed from the introduction of said second fluid into said first fluid until said second fluid adjacent said interface reaches said detecting means, said last mentioned means calculating the flow rate of said second fluid through said passageway means based on said volumetric capacity and said elapsed time and for providing said signal indicative thereof.

18. The apparatus of claim 17 wherein said diffusing means comprises a plurality of spherical members creating a plurality of interstices therebetween and through which said fluids flow.

19. The apparatus of claim 18 additionally comprising a funnel shaped surface adjacent said diffusing means and contiguous with said passageway means, wherein said spherical members are contained within said funnel shaped surface and wherein said funnel shaped surface extends at an acute angle with respect to said longitudinal axis.

20. The apparatus of claim 19 wherein said angle is approximately 60°.

21. The apparatus of claim 18 wherein each of said spherical members is formed of stainless steel.

* * * * *